United States Patent [19]

Riegler et al.

[11] 4,192,491

[45] Mar. 11, 1980

[54] ROTATABLE OR TILTABLE METALLURGICAL VESSEL

[75] Inventors: Ernst Riegler, Enns; Manfred Schmidt, Linz, both of Austria

[73] Assignee: Voest-Alpine Aktiengesellschaft, Linz, Austria

[21] Appl. No.: 893,051

[22] Filed: Apr. 3, 1978

[30] Foreign Application Priority Data

Apr. 14, 1977 [AT] Austria ............................... 2590/77
Aug. 3, 1977 [AT] Austria ............................... 5709/77

[51] Int. Cl.² .......................... C21C 1/06; F16C 11/02
[52] U.S. Cl. .................................. 266/245; 248/137; 308/3 R; 308/203; 266/277
[58] Field of Search ................ 248/130, 137; 266/44, 266/245, 248, 275, 277; 308/3 R, 203, 204, 73

[56] References Cited

U.S. PATENT DOCUMENTS

| | | | |
|---|---|---|---|
| 1,485,016 | 2/1924 | Cardullo et al. | 308/3 R |
| 2,334,019 | 11/1943 | McFeathers | 266/277 |
| 3,494,602 | 2/1970 | Shindo | 308/203 X |
| 3,984,159 | 10/1976 | Jenness | 308/73 |
| 4,047,769 | 9/1977 | Chielens | 308/73 |
| 4,062,415 | 12/1977 | Miller | 266/91 X |
| 4,080,014 | 3/1978 | Riegler et al. | 308/3 R X |
| 4,106,824 | 8/1978 | Meystre et al. | 308/73 |

*Primary Examiner*—Paul A. Bell
*Attorney, Agent, or Firm*—Brumbaugh, Graves, Donohue & Raymond

[57] ABSTRACT

A rotatable or tiltable metallurgical vessel, in particular a pig iron mixer, is mounted in a fixed bearing and an expansion bearing. A toothed element is arranged on the vessel jacket between the two bearings and a driven counter-element engages the toothed element. The expansion bearing and the fixed bearing are designed as slide bearings that include raceways fastened to the vessel jacket at a distance from each other, and arcuate slideways formed of slide plates that accommodate the raceways.

19 Claims, 13 Drawing Figures

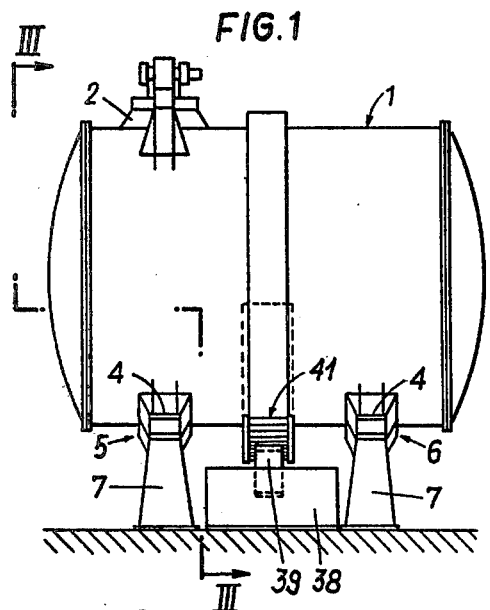
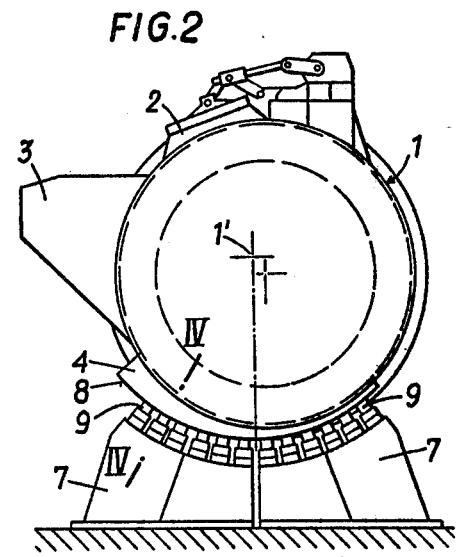
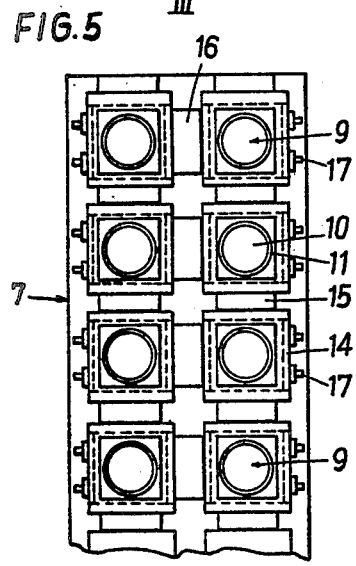
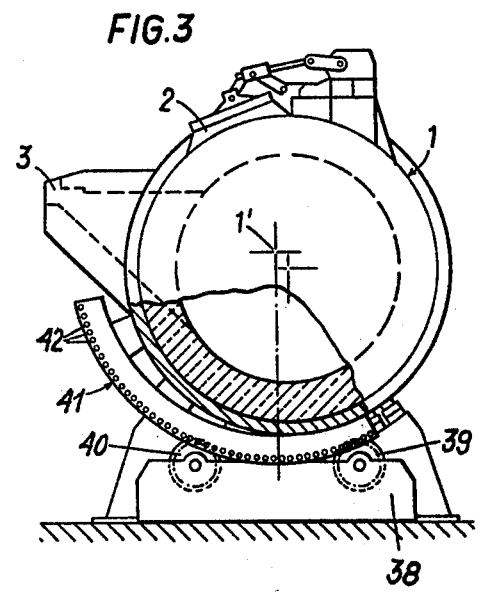
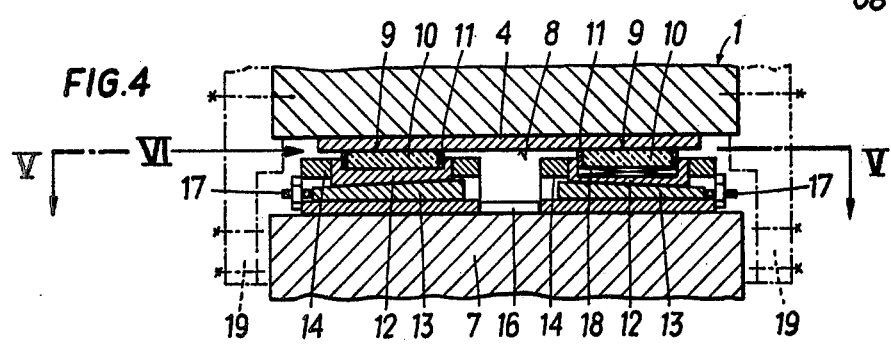

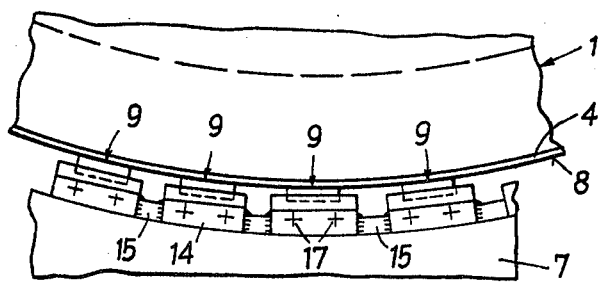
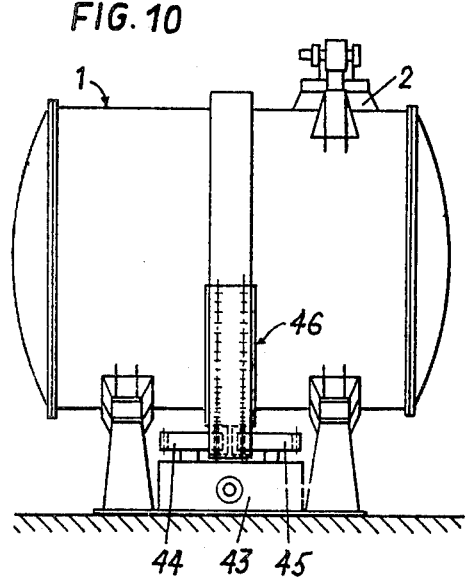
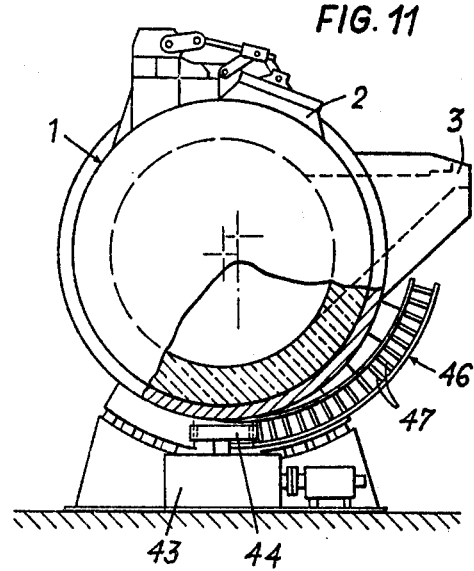
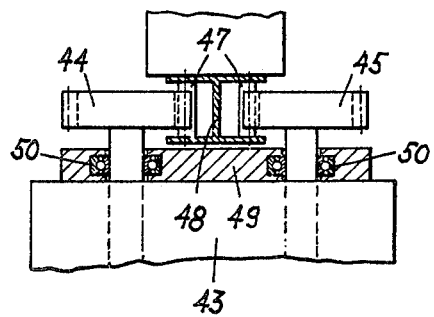
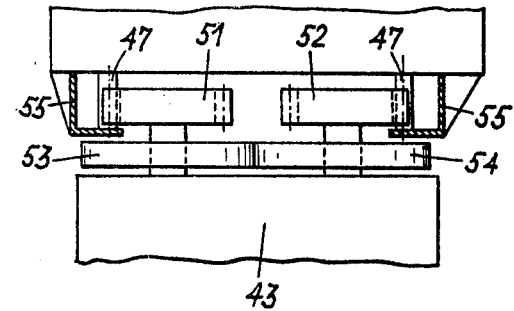

ROTATABLE OR TILTABLE METALLURGICAL VESSEL

BACKGROUND OF THE INVENTION

The invention relates to a rotatable or tiltable metallurgical vessel, in particular a pig iron mixer, having two raceways fastened, at a distance from each other, to the jacket of the metallurgical vessel, one raceway is mounted in a fixed bearing and the other is in an expansion bearing. A toothed element is arranged on the vessel jacket between the raceways, with which toothed element a driven counter-element engages.

Known pig iron mixers of this kind are mounted with their raceways on rollers, the rollers being guided by means of cages movable between the base and the raceways. In order to reach a synchronous movement of the rollers on the fixed-bearing side with those of the expansion-bearing side, i.e. in order to prevent slanting or moving of the pig iron mixer to one side, the cages of the expansion bearing and the fixed bearing have to be interconnected by transverse connections extending parallel to the longitudinal axis of the vessel. A plurality of X-shaped braces have been used for those connections. Despite those braces it has not been possible in practice to obtain completely synchronous running of the rollers of the expansion bearing with those of the fixed bearing, since, due to differences in lubrication and thermal stresses during charging and discharging as well as unequal friction conditions, relative movements between the rollers of the fixed bearing and those of the expansion bearing cannot be totally excluded. A play has always been present between the roller cages and the rollers, so that slanting of the rollers, and thus moving and slanting of the vessel, is inevitable despite the transverse braces. Slanting of the vessel and of the rollers in this case can lead to self-stoppage of the rollers, so that the vessel cannot be moved by means of its tilting drive any more. Due to the line contact of the rollers with the raceways, a vessel once slanted cannot slide back into its normal position by itself. It happens in fact that, with pig iron mixers mounted on rollers, the vessel slants considerably during a period of several months and has to be pressed back into its normal position by means of huge hydraulic presses.

The transverse braces interconnecting the cages and carrying out the movements of the cages which move at half angle speed compared to the pig iron mixer, make it impossible to accommodate the drive elements for the tilting movement below the vessel, i.e. within the vertical projection of the contours of the vessel. The drive elements—e.g. a pinion engaging with a toothed track extending about the periphery of the vessel, or a toothed rack linked to the jacket of the pig iron mixer—have to be provided laterally of the vessel, thus reducing the space around the vessel and complicating its accessibility. In particular access is low for pig iron mixers that have a separate charge opening and a discharge lip in which charging and discharging take place in the tilting counterdirection. Arranging drive elements beside the vessel therefore is undesirable and efforts have been made to accommodate the drive below the vessel, which efforts have not been satisfactorily effected so far. The known roller mountings—in addition to the question of the accessibility to the pig iron mixer and the great space needed for the drive—have also the disadvantage that both on the side of the base and on that of the pig iron mixer, very heavy bearings and supporting constructions, respectively, are necessary for the raceways of the rollers.

SUMMARY OF THE INVENTION

The invention aims at avoiding these disadvantages and difficulties and has as its object to provide a metallurgical vessel of the initially-described kind in which damage by slanting is avoided, and whose mounting is simpler, operationally safer and requires less material and space, thus assuring good accessibility to the metallurgical vessel. In particular, it should be possible to arrange the drive below the metallurgical vessel, so that the drive is protected by the vessel and does not require additional space beside the vessel. The problems of pig iron mixers described above analogously arise also with other tiltable metallurgical vessels, for instance with tiltable open-hearth furnaces, so that the solution to the problems according to the invention can accordingly be applied also to tiltable metallurgical vessels other than pig iron mixers.

These objects are achieved according to the invention in that the expansion bearing and the fixed bearing are designed as slide bearings with the raceways being arranged on arcuate slideways formed of a plurality of slide plates. When using slide plates, a face contact will prevail between the raceways and the slide plates, whereby, contrary to roller-mounted vessels in which the vessel weight is transmitted via contact lines into the base, a better guidance of the vessel is guaranteed so that slanting of the vessel is prevented.

The raceway advantageously is coated with a slide foil coacting with the slide plates and preferably made of special steel.

To provide for simpler assemblage and exchange of the slide elements, each slide plate is arranged in a cage fixed on a stationary supporting construction, and is adjustable perpendicularly to the slideway by means of a wedge plate.

Suitably, a plurality of cages accommodating slide plates are combined into a construction unit.

According to a preferred embodiment, each slide plate is inserted into a recess of a wedge plate which coacts with a counter wedge plate displaceably guided in the cage.

For weight determinations, a force-measuring element is advantageously installed between a wedge plate and a slide plate.

In a preferred embodiment of the invention the slide plates are hydraulically supported against a stationary supporting construction. This embodiment makes it possible to allow the slide plates to contact the arcuate slideways with a certain pressure, i.e. to adjust a certain pressure distribution pattern over the lengths of the slideways. With this solution, higher wear and early abrasion of the slide plates during deviation of the slideways from the ideal form of a circular arc—which may happen due to production inaccuracies and deformations during operation of a pig iron mixer—are prevented. Furthermore, adjustment of the position of the slide plates is effected in a simple way.

Advantageously, each slide plate is mounted on a primary piston which is positioned with its axis at a right angle to the slideway and is inserted in a cylindrical bushing arranged on the stationary supporting construction. A hydraulic means being admitted to the cylindrical bushing for moving and supporting the piston.

According to a preferred embodiment each slide plate is mounted on an auxiliary piston which is inserted in a recess of the primary piston and is adjustable relative to the primary piston in the axial direction of the latter, preferably hydraulically, whereby the position of the slide plates is adjustable relative to the slideway. This adjustment is independent of the position of the primary pistons and as a result the slide plates are exchangeable without having to lift the metallurgical vessel off its mounting.

Advantageously, each cylindrical bushing is connected, via a hydraulic conduit, with a pressure-compensating vessel whose pressure is adjustable by means of a pressure piston to which gas is admitted.

A particularly simple type of construction is characterized in that several cylindrical bushings are each combined into a construction unit.

Advantageously, several cylindrical bushings are each connected by a pressure-compensating conduit provided for the hydraulic pressure medium.

By using slide bearings the transverse bracings necessary with roller bearings can be eliminated, so that it is possible to arrange the drive, including the motor and the gearing, for a toothed pinion of a pin tooth arrangement, between the raceways in the region of the vertical projection of the contours of the pig iron mixer.

In this case, the gearing advantageously is a torque-dividing gearing having two pinions that engage a pin row extending about the periphery of the vessel and whose axes extend parallel to the rotation or tilting axis of the vessel, thus leading to a particularly low construction height for the gearing.

According to a further embodiment the gearing is a torque-dividing gearing with two pinions whose axes are directed perpendicular to the rotation or tilting axis, the pinions engaging with double-pin rows extending about the periphery of the vessel and whose pins are directed perpendicular to the rotation or tilting axis of the vessel.

In this case it is suitable if the pin rows are mounted in a double-T-shaped carrier, the opposing pinions engaging from outside the carrier and the axes of the pinions being secured against each other by a bracket that accommodates tensile forces. If the pin rows are each mounted in an L-shaped carrier, into which the two pinions engage from inside the carrier, the axes of the pinions are kept at a distance by two discs that accommodate pressure forces.

A method of operation of a vessel according to the invention is characterized in that differing pressures are hydraulically admitted to individual slide plates or groups thereof, the pressure pattern or course over the length of the slideways being adjusted so as to rise from a minimum value at the ends of the slideways to a maximum value at the vertex of the slideways.

In this case it is advantageous, if the pressure course over the length of the slideways is adjusted so as to correspond approximately to the vertex arc of a sine line.

BRIEF DESCRIPTION OF THE DRAWINGS

The invention shall be explained in more detail by way of several embodiments and with reference to the accompanying drawings, wherein:

FIG. 1 is a side view of one embodiment;

FIG. 2 is a front view of the embodiment of FIG. 1;

FIG. 3 is a partial section along line III—III of FIG. 1;

FIGS. 4, 5 and 6 represent details of the mounting according to the invention in a larger scale, FIG. 4 showing a section along line IV—IV of FIG. 2, FIG. 5 showing a section along line V—V of FIG. 4, and FIG. 6 showing a view in the direction of the arrow VI of FIG. 4;

FIGS. 10 and 11 illustrate a further embodiment, in an analogous way to FIGS. 1 and 3;

FIG. 12 shows a detail of FIG. 10 on a larger scale and partly sectioned; and

FIG. 13 illustrates a still further embodiment in an analogous way to FIG. 12.

DESCRIPTION OF EXEMPLARY EMBODIMENTS

Figure 8:
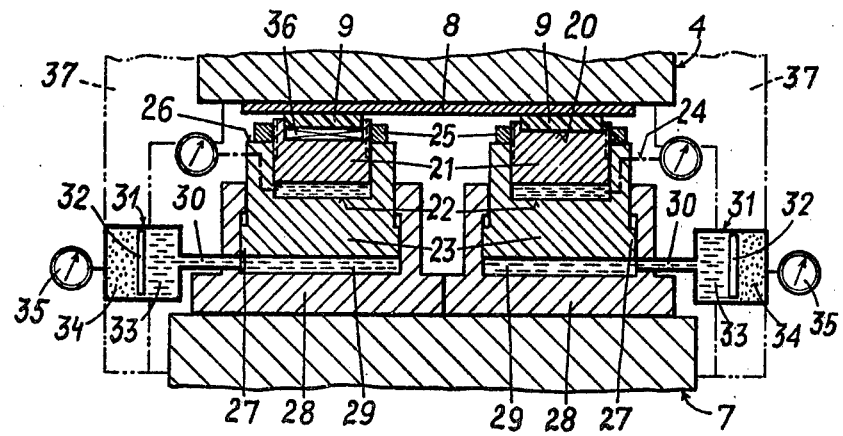
FIG. 8 represents a section along line VIII—VIII of FIG. 7.

The cylindrical jacket of a pig iron mixer 1 that is tiltable about a tilting axis 1' has a charge opening 2 and a discharge lip 3 provided on its periphery. On the lower side of the jacket 1 two raceways 4 are arranged at a distance from each other, one of which is mounted in an expansion bearing 5 and the other in a fixed bearing 6. The bearings 5, 6 rest on base supports 7. According to the invention the bearings 5, 6 are designed as slide bearings. The running faces 4, which are coated with a slide foil 8 of special steel, rest on slide plates 9 mounted on the base supports, which slide plates are advantageously made up of a synthetic body 10 of polytetrafluorethylene and a supporting ring 11 surrounding the synthetic body. Each slide plate 9 is inserted in a recess of a wedge plate 12 resting on a counter wedge plate 13. The wedge plate and the counter wedge plate are arranged together in a recess of a cage 14 fastened on the respective base support 7, for instance by screws not illustrated. The cages 14, which are adjacently arranged, are kept at a distance from each other by spacers 15, 16, as can be seen from FIG. 5. The counter wedge plates 13 are displaceable in the direction of the tilting axis 1' of the pig iron mixer by means of screws 17, whereby the wedge plates 12 and with them the slide plates 9 can be shifted radially to the rotation or tilting axis 1' of the pig iron mixer, i.e. perpendicularly to the arcuate slideways formed by the slide plates. By this, the slide plates 9 can be brought into an ideal position, so that carrying of the vessel weight of all of the slide plates is guaranteed. The wedge plates also make it easier to remove the slide plates 9 by disengaging the slide plates 9 radially outwards from the running faces. After this, the damaged slide plates can be removed in the direction of the tilting axis 1' without it being necessary to interrupt the operation of the pig iron mixer.

For purposes of weight determinations of the pig iron mixer, for instance for determining the amount of pig iron removed, force-measuring elements 18 can be installed between the slide plates 9 and the wedge plates 12, as is shown in FIG. 4 at the right-hand slide plate.

For simpler handling of the cages during mounting and dismounting of the same, some cages can be combined into a construction unit whereby the cages are interconnected by spacers which, for instance, are welded to the cages, as is shown in FIG. 6.

Side guides 19 illustrated in FIG. 4 by dot-and-dash lines are provided at the fixed bearing 6 of the pig iron mixer.

Figure 7:
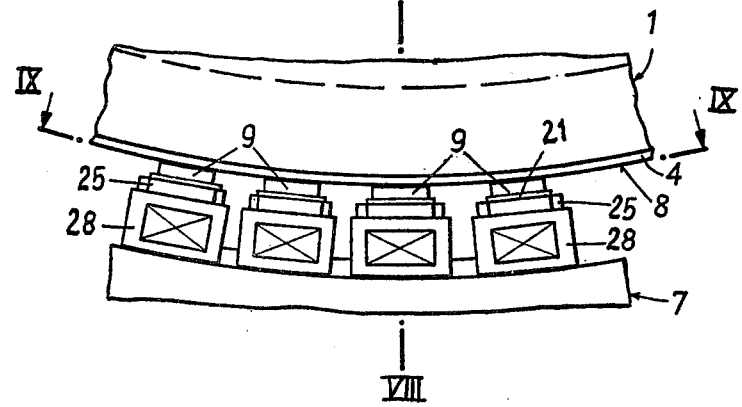
FIG. 7 illustrates a detail of another embodiment of a mounting for a pig iron mixer on a larger scale.
Figure 9:
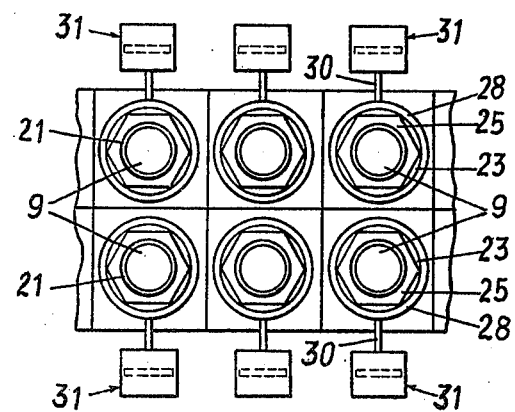
FIG. 9 is a section along line IX—IX of FIG. 7.

In the embodiment illustrated in FIGS. 7 to 9, a pig iron mixer is mounted on each of the slide plates 9, which plates are inserted in recesses 20 of auxiliary pistons 21. The auxiliary pistons 21 are each in turn inserted into a primary bore 22 of a piston 23. The axes of piston 23 are at right angles to the raceway 4 and the axes of the bores 22 are directed at right angles to the slideway. By the hydraulic conduit 24 a pressure medium can be admitted to the bore 22, so that the slide plates 9 can be shifted radially to the rotation or tilting axis 1' of the pig iron mixer. The end of the auxiliary piston 21 carrying the slide plates 9 comprises an adjusting ring 25 which can be braced via threads on it relative to the end face 26 of the piston 23, which end face 26 is directed towards the running face 4.

The piston 23, with its lower end 27 having a broadened diameter, is inserted in a cylindrical bushing 28 so as to be axially displaceable. In the free space 29 between the cylindrical bushing and the piston, a hydraulic conduit 30 enters, to which conduit a compensation-pressure room 31 is connected. The compensation-pressure room is divided into two chambers 33, 34 by a pressure piston 32 that is displaceable within it, the chamber 34 being filled with a pressure gas. The gas pressure prevailing in this chamber can be adjusted by valves, not illustrated, and checked on a manometer 35.

The function of this arrangement is the following: At first, after inserting the slide plate 9 into the recess 20 of the auxiliary piston 21, the latter is hydraulically pressed into a predetermined height relative to the piston 23 and fixed at that height by means of the adjustment ring 25, so that the auxiliary piston 21 will remain at the chosen height, even if the hydraulic conduit 24 becomes depressurized. Afterwards, a predetermined gas pressure acting on the pressure piston is adjusted in the chamber 34. By this method, the piston 23 is pressed by a certain pressure against the raceway 4 of the pig iron mixer. If the raceway shows uneven spots or if it deviates from the ideal form of a cylindrical face, the piston 23, and thus the slide plate 9, can give way during tilting of the pig iron mixer due to the resilient pressure gas, but will remain adjusted to the raceway approximately at the initially chosen pressure.

If a slide plate 9 is to be exchanged, the adjustment ring 25 is loosened and the pressure means present between the auxiliary piston 21 and the piston 23 is released. Because of this action, the auxiliary piston 21 can immerse deeper into the piston 23. Thus, the slideway plate 9 is brought out of engagement with the raceway 4, so that it can be removed, after being taken out of the recess 20 of the auxiliary piston 21, in the direction of the tilting axis 1' of the mixer. This can be done without an interruption of the operation of the pig iron mixer. Before dismounting a slide plate the hydraulic conduit 30 supplying the respective cylindrical bushing 28 has to be locked.

Advantageously two or more adjacently arranged cylindrical bushings 28 can be connected to one compensation-pressure room.

For purposes of weight determinations of the pig iron mixer, for instance for determining the amount of pig iron removed, force-measuring elements 36 can be installed between the slide plates 9 and the auxiliary piston 21, as is shown in FIG. 8 at the left-hand slide plate 9.

The side faces 37 illustrated in FIG. 8 by a dot-and-dash line are provided at the fixed bearing 6 of the pig iron mixer.

Suitably, the slide plates provided at the ends of the slideway are supplied with only light pressure, whereas a higher pressure is admitted to the slide plates arranged nearer to the slideway centre, i.e. nearer to the vertex of the slideway; by this, a pressure course or pattern is reached over the length of the slideway which corresponds approximately to the vertex arc of a sine line.

As can be seen from FIG. 1, a torque-dividing gearing 38 including a motor is arranged below the pig iron mixer, between the base supports 7, which gearing comprises two tooth-carrying drive pinions 39, 40, whose axes extend parallel to the tilting axis 1' of the vessel. The pinions 39, 40 engage with a pin row 41 of a pin tooth arrangement mounted on the jacket 1 of the pig iron mixer, whose pins 42 are directed parallel to the tilting axis 1' of the vessel.

In the embodiment illustrated in FIGS. 10 to 12, a torque-dividing gearing 43 is provided with two pinions 44, 45, whose axes are directed perpendicular to the rotation and tilting axis 1' of the vessel. These pinions engage with a double-pin row 46 mounted on the jacket 1 of the vessel. Pins 47 of the row 46 are directed perpendicular to the rotation or tilting axis 1' of the vessel. According to the embodiment illustrated in FIGS. 10 to 12, the pins 47 mounted in a double-T-shaped carrier 48, the pinions 44, 45 engaging the pins from outside the carrier structure and the axes of the pinions being secured relative to each other by a bracket 49 that accommodates tensile forces and is mounted on the axes by means of antifriction bearings 50.

According to FIG. 13 the pins 47 are each inserted in a separate L-shaped carrier 55 and the pinions 51, 52 engage with the pins 47 from inside the carrier structure. The axes of the pinions are kept at a distance from each other by discs 53, 54 that accommodate compression or pressure forces and are connected with the axes of the pinions so as to be secured against rotation, one disc rolling off the other.

What we claim is:

1. In a rotatable or tiltable metallurgical vessel, e.g. a pig iron mixer, of the type including a jacket, a fixed bearing and an expansion bearing for mounting said metallurgical vessel, two raceways fastened to said jacket of said metallurgical vessel at a distance from each other, one of said two raceways being mounted in said fixed bearing and the other of said two raceways being mounted in said expansion bearing, a toothed element arranged on said jacket of said metallurgical vessel between said two raceways, a driven counter-element engaging with said toothed element, and drive means for driving said driven counter-element, the improvement characterized in that said expansion bearing and said fixed bearing are designed as slide bearings, each slide bearing including one of said two raceways and an arcuate slideway formed by a plurality of slide plates, each one of said two raceways resting on its pertaining arcuate slideway.

2. A rotatable or tiltable metallurgical vessel as set forth in claim 1, further comprising a slide foil coating provided on said two raceways, said slide foil coating coacting with said slide plates.

3. A rotatable or tiltable metallurgical vessel as set forth in claim 1, further comprising a stationary supporting construction, a plurality of cages being fixed to said stationary supporting construction for accommodating each one of said plurality of slide plates, and wedge means for perpendicularly adjusting each of said plurality of slide plates relative to said slideway.

4. A rotatable or tiltable metallurgical vessel as set forth in claim 3, wherein several of said plurality of cages accommodating said plurality of slide plates are combined so as to form a construction unit.

5. A rotatable or tiltable metallurgical vessel as set forth in claim 3, wherein said wedge means include wedge plates, each wedge plate having at least one recess for accommodating the pertaining one of said plurality of slide plates therein, and counter wedge plates displaceably guided in said plurality of cages, said wedge plates coacting with said counter wedge plates to adjust each of said plurality of slide plates relative to said slideway.

6. A rotatable or tiltable metallurgical vessel as set forth in claim 3, further comprising force-measuring means installed between at least one of said wedge plates and at least one of said plurality of slide plates.

7. A rotatable or tiltable metallurgical vessel as set forth in claim 1, further comprising a stationary supporting construction, said plurality of slide plates being hydraulically supported against said stationary supporting construction.

8. A rotatable or tiltable metallurgical vessel as set forth in claim 7, further comprising a plurality of primary pistons, each one of said plurality of primary pistons being directed with its axis at a right angle to said slideway and accommodating at least one of said plurality of slide plates, a plurality of cylindrical bushings being arranged on said stationary supporting construction, each one of said plurality of primary pistons being inserted in one of said plurality of cylindrical bushings and being movable with a hydraulic medium admissible into said cylindrical bushing.

9. A rotatable or tiltable metallurgical vessel as set forth in claim 8, further comprising at least one pressure-compensating vessel including a pressure piston, gas being admitted to said pressure piston, and a hydraulic conduit connecting said at least one pressure-compensating vessel and each one of said plurality of cylindrical bushings, the pressure prevailing in said at least one pressure-compensating vessel being adjustable by means of said pressure piston.

10. A rotatable or tiltable metallurgical vessel as set forth in claim 8, wherein several of said plurality of cylindrical bushings are combined so as to form a construction unit.

11. A rotatable or tiltable metallurgical vessel as set forth in claim 8, further comprising a pressure-compensating conduit for the hydraulic medium, several of said plurality of cylindrical bushings being connected by means of said pressure-compensating conduit.

12. A rotatable or tiltable metallurgical vessel as set forth in claim 1, wherein said drive means include a motor and a gearing, said driven counter-element is at least one toothed pinion and said toothed element is a pin row, said drive means being provided between said two raceways in a region delimited by a vertical projection of the contours of said pig iron mixer.

13. In a rotatable or tiltable metallurgical vessel, e.g. a pig iron mixer, of the type including a jacket, a fixed bearing and an expansion bearing for mounting said metallurgical vessel, two raceways fastened to said jacket of said metallurgical vessel at a distance from each other, one of said two raceways being mounted in said fixed bearing and the other of said two raceways being mounted in said expansion bearing, a toothed element arranged on said jacket of said metallurgical vessel between said two raceways, a driven counter-element engaging with said toothed element, and drive means for driving said driven counter-element, the improvement characterized in that:

said expansion bearing and said fixed bearing are designed as slide bearings, each slide bearing including one of said two raceways and an arcuate slideway formed by a plurality of slide plates, each one of said two raceways resting on its pertaining arcuate slideway;

a plurality of primary pistons hydraulically support said plurality of slide plates against a stationary supporting construction, each one of said plurality of primary pistons being arranged with its axis at a right angle to said slideway and accommodating at least one of said plurality of slide plates, each one of said plurality of pistons having a recess;

a plurality of auxiliary pistons are inserted in the recesses of the plurality of primary pistons, said auxiliary pistons being adjustable relative to said primary pistons in the axial direction thereof, said plurality of slide plates being mounted on said plurality of auxiliary pistons; and a plurality of cylindrical bushings are arranged on said stationary supporting construction, said plurality of primary pistons being inserted in said plurality of bushings and being movable relative to the slideway by a hydraulic medium admissible into said cylindrical bushing.

14. A rotatable or tiltable metallurgical vessel as set forth in claim 13, wherein each one of said plurality of auxiliary pistons is hydraulically adjustable relative to the pertaining one of said plurality of primary pistons.

15. A rotatable or tiltable metallurgical vessel as set forth in claim 13, further comprising at least one pressure-compensating vessel including a pressure piston, gas being admitted to said pressure piston, and a hydraulic conduit connecting said at least one pressure-compensating vessel and each one of said plurality of cylindrical bushings, the pressure prevailing in said at least one pressure-compensating vessel being adjustable by means of said pressure piston.

16. In a rotatable or tiltable metallurgical vessel having a rotation or tilting axis, e.g. a pig iron mixer, of the type including a jacket, a fixed bearing and an expansion bearing for mounting said metallurgical vessel, two raceways fastened to said jacket of said metallurgical vessel at a distance from each other, one of said two raceways being mounted in said fixed bearing and the other of said two raceways being mounted in said expansion bearing, a toothed element arranged on said jacket of said metallurgical vessel between said two raceways, a driven counter-element engaging with said toothed element, and drive means for driving said driven counter-element, the improvement characterized in that:

said expansion bearing and said fixed bearing are designed as slide bearings, each slide bearing including one of said two raceways and an arcuate slideway formed by a plurality of slide plates, each one of said two raceways resting on its pertaining arcuate slideway;

said drive means include a motor and a torque-dividing gearing and are provided in a region delimited by a vertical projection of the contours of said metallurgical vessel;

said driven counter-element includes two toothed pinions having axes extending parallel to the rotation or tilting axis of said metallurgical vessel; and said toothed element is a pin row extending about the periphery of said metallurgical vessel, the two toothed pinions engaging with said pin row.

17. In a rotatable or tiltable metallurgical vessel having a rotation or tilting axis, e.g. a pig iron mixer, of the type including a jacket, a fixed bearing and an expansion bearing for mounting said metallurgical vessel, two raceways fastened to said jacket of said metallurgical vessel at a distance from each other, one of said two raceways being mounted in said fixed bearing and the other of said two raceways being mounted in said expansion bearing, a toothed element arranged on said jacket of said metallurgical vessel between said two raceways, a driven counter-element engaging with said toothed element, and drive means for driving said driven counter-element the improvement characterized in that:

said expansion bearing and said fixed bearing are designed as slide bearings, each slide bearing including one of said two raceways and an arcuate slideway formed by a plurality of slide plates, each one of said two raceways resting on its pertaining arcuate slideway;

said drive means include a motor and a torque-dividing gearing and are provided in a region delimited by a vertical projection of the contours of said metallurgical vessel;

said driven counter-element includes two toothed pinions having axes directed perpendicular to said rotation or tilting axis of said metallurgical vessel; and said toothed element is a double-pin row extending peripherally about said metallurgical vessel and having pins directed perpendicular to said rotation or tilting axis, said two toothed pinions engaging with said double-pin row.

18. A rotatable or tiltable metallurgical vessel as set forth in claim 17, further comprising a double-T-shaped carrier, said double-pin-row having pin rows mounted in said double-T-shaped carrier, said two toothed pinions opposing each other and engaging in said pin rows from outside the carrier, a bracket being provided for accommodating tensile forces and securing said axes of said two toothed pinions with respect to each other.

19. A rotatable or tiltable metallurgical vessel as set forth in claim 17, wherein said double-pin-row has pin rows and wherein an L-shaped carrier is provided for each one of said pin rows, to accommodate said pin rows therein, said two toothed pinions engaging in said pin rows from inside the carriers, two discs being provided for accommodating pressure forces and keeping the axes of said two toothed pinions at a distance from each other.

* * * * *